UNITED STATES PATENT OFFICE.

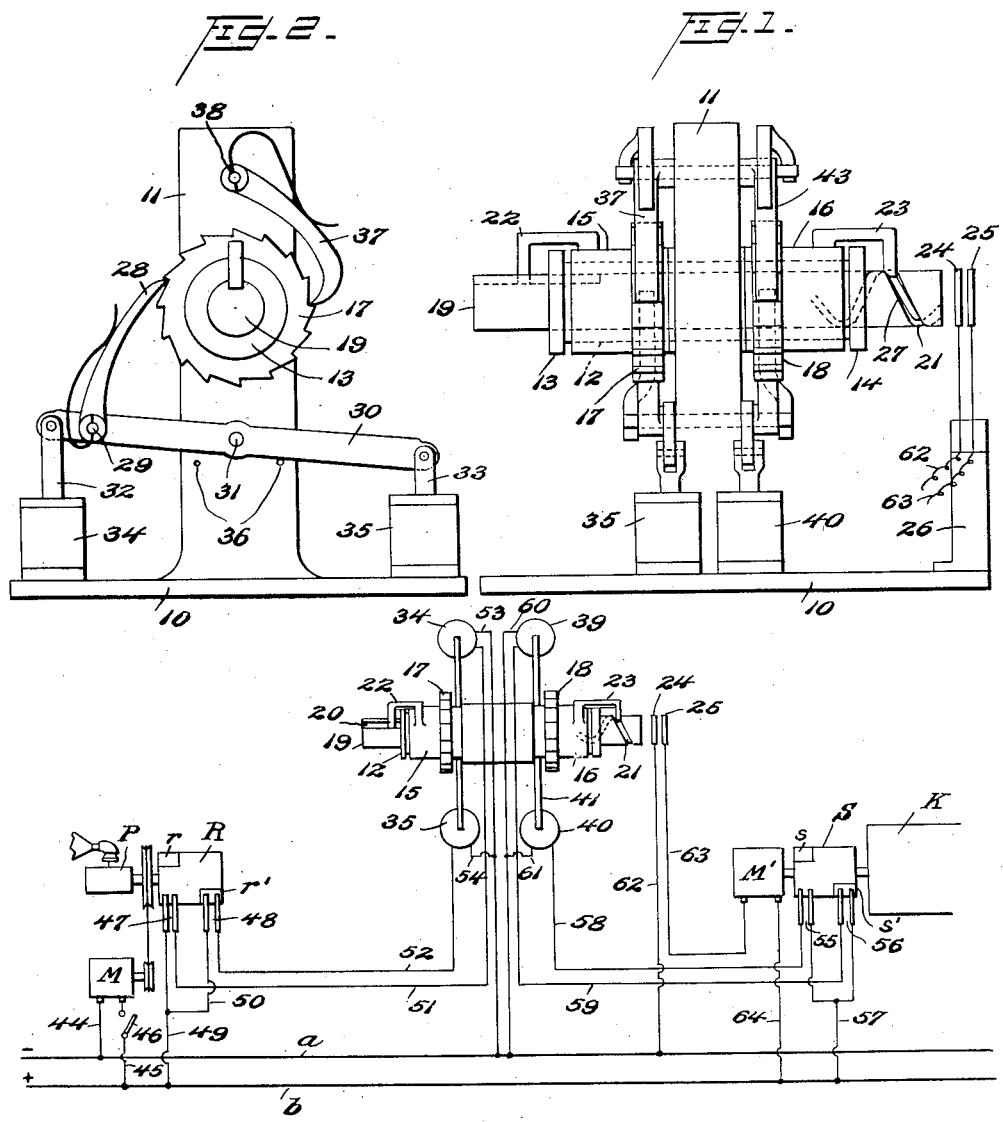

LADISLAV O. KOZAR, OF MIDDLETOWN, PENNSYLVANIA.

SYNCHRONIZING APPARATUS.

1,362,876.  Specification of Letters Patent.  Patented Dec. 21, 1920.

Application filed January 30, 1917. Serial No. 145,516.

*To all whom it may concern:*

Be it known that I, LADISLAV O. KOZAR, a citizen of the United States, residing at Middletown, Dauphin county, State of Pennsylvania, have invented certain new and useful Improvements in Synchronizing Apparatus, of which the following is a specification.

This invention relates to synchronizing apparatus which is designed to keep one of two machines operating in synchronism with the other.

In the synchronizing apparatus embodying my invention two independent members are driven at speeds proportional to the speeds of the machines to be synchronized and the object of my invention is to provide a simple and novel mechanism by means of which the difference of movement between the two members controls the power supplied to one of the machines and keeps the latter in synchronism with the other machine.

The above and other objects and the novel features of the invention will be apparent from the following description taken in connection with the drawing, in which Figure 1 is a side elevation of a synchronizing apparatus embodying my invention;

Fig. 2 is an end elevation of the same, looking at the left end of the apparatus shown in Fig. 1, and Fig. 3 is a diagrammatic view illustrating the machines to be synchronized with one another and the synchronizing apparatus connected in circuit therewith.

In the drawing, I have illustrated the synchronizing apparatus as arranged to keep a motion picture projecting machine K in synchronism with a phonograph cylinder P, but it is to be understood that this illustration is only typical and that the synchronizing apparatus may be used for the purpose of keeping any two independent rotating members in synchronism with each other.

The synchronizing apparatus is mounted on a base 10 which has a central standard 11. The standard 11 has an opening therein to receive a sleeve 12 which extends a considerable distance beyond the sides of the standard 11 and is keyed thereto. The ends of the sleeve 12 are provided with the enlargements 13 and 14, one of which may be threaded onto the sleeve. The hubs 15 and 16 of the ratchet wheels 17 and 18 are rotatably mounted on the parts of the sleeve 12 between the standard 11 and the enlargements 13 and 14, respectively. The ratchet wheels 17 and 18 are rigidly connected to their hubs so that the latter will rotate when the ratchet wheels are turned.

The body of the sleeve 12 constitutes an elongated bearing for the shaft or rod 19 and the ends of the latter project a distance beyond the ends of the sleeve 12. One end of the shaft 19 has a straight groove 20 in its outer surface parallel to the axis of the shaft and a helical groove 21 extends around the axis of the shaft in the outer surface of the other end of the shaft 19. The hub 15 has an arm 22 rigidly secured to it and bent so that its end will extend into the straight groove 20 and when the ratchet wheel 17 is rotated the arm 22 will serve as a spline between the hub 15 and the shaft 19, allowing the shaft 19 to move axially independently of the hub 15, but compelling the shaft 19 to rotate when the hub 15 is rotated.

The hub 16 has an arm 23 rigidly secured to it and bent so that the end thereof will extend into the helical groove 21. This connection between the shaft 19 and the hub 16 controls the axial movement of the shaft 19. It will be understood that when the ratchet 18, hub 16 and arm 23 are stationary and the ratchet 17, hub 15 and arm 22 are rotated clockwise the shaft 19 will be caused to move toward the right to close the contacts 24 and 25, which are resiliently supported on a mounting 26 carried by the base 10. When the ratchets 17 and 18 are being driven at the same speed the shaft 19 will not move axially, which will be the condition when the two machines being synchronized are rotating in synchronism. When the ratchet wheel 18 is being driven faster than the ratchet wheel 17 the end of the arm 23 will bear against the rear wall of the helical groove 21 and cause the shaft 19 to move axially toward the left, in Figs. 1 and 3, and away from the contacts 24 and 25. The part of the contact 24 facing the end of the shaft 19 is provided with an insulated part to insulate the synchronizing apparatus from the electric circuit.

Each of the ratchet wheels 17 and 18 is turned intermittently by an electro-magnetic operating device. The ratchet wheel 17 is turned intermittently by a spring pressed pawl 28 pivoted at 29 on the operating bar 30. The operating bar is pivoted at its center at 31 on the standard 11 and the opposite ends thereof carry the plungers 32 and 33 of the electro-magnets 34 and 35. The electro-magnets 34 and 35 are alternately energized to rock the operating bar 30 on its pivot to feed the ratchet wheel 17 in a clockwise direction. The stops 36 limit the throw of the bar 30.

A spring pressed pawl 37 pivoted at 38 on the standard 11 keeps the ratchet wheel 17 locked against counter-clockwise rotation.

The ratchet wheel 18 is rotated in substantially the same manner as the ratchet wheel 17, by means of two electro-magnets 39 and 40 which rock a bar 41 pivoted on the standard 11. The bar 41 carries a pawl corresponding to the pawl 28 of the bar 30 and a pawl 43 corresponding to the pawl 37 keeps the ratchet wheel 18 from counter-clockwise rotation. The ratchet wheels 17 and 18 are thus rotated in the same direction by similar mechanisms.

The electro-magnets 34 and 35 which cause the rotation of the ratchet wheel 17 are energized alternately by a commutator R which is connected with the shaft carrying the phonograph cylinder P and rotated by the electric motor M. The motor M is connected to the circuit mains $a$, $b$, by the wires 44, 45 and the switch 46. The commutator R carries two contact plates $r$, $r'$ located 180° apart on the surface of the commutator and adapted to alternately connect together the pairs of brushes 47, 48 which are in circuit with the magnets 34 and 35. One of the pair of brushes 47 is connected to the supply main $b$ by a wire 49 and one of the pair of brushes 48 is connected to the supply main $b$ by a wire 50. The other brushes bearing on the commutator R are connected to the electro-magnets 34 and 35 by the wires 51 and 52, respectively. The other end of the winding of the magnet 34 is connected to the supply main $a$ by a wire 53 and the other end of the winding of the magnet 35 is connected to the supply main $a$ by a wire 54.

The motor M' which drives the moving picture projecting apparatus K also rotates a commutator S which carries metal plates $s$, $s'$ 180° apart on its cylindrical surface. The plates $s$ and $s'$ are adapted to electrically connect the pairs of brushes 55 and 56 to energize the magnets 40 and 39, respectively. One of the brushes 55 and one of the brushes 56 are connected to the supply main $b$ by a wire 57 and the other of the brushes 55 and 56 are, respectively, connected to the magnets 40 and 39 by the wires 58 and 59. The other end of the winding of the magnet 39 is connected to the supply main $a$ by a wire 60 and the other end of the winding of the magnet 40 is connected to the supply main $a$ by a wire 61.

The operation of the mechanism is briefly as follows: When the switch 46 is closed the motor M starts and rotates the phonograph cylinder P and the commutator R. The latter causes the magnets 34 and 35 to be alternately energized and the ratchet wheel 17 and arm 22 are intermittently rotated in a clockwise direction, also turning the shaft in the same direction. Since the ratchet wheel 18 and arm 23 are stationary the shaft 19 will be fed to the right until the circuit of the motor M' is closed by the following path: Supply main $a$, through the wire 62, contacts 24 and 25, wire 63, motor M', wire 64 to the supply main $b$. This starts the motor M', commutator S and kinetoscope K. The commutator S causes the magnets 39 and 40 to be energized alternately and these drive the ratchet wheel 18 and arm 23. When the ratchet wheel 18 is driven at a slightly greater speed than the ratchet wheel 17 is driven, the shaft or rod 19 will move away from the contacts 24 a slight distance to open them and thereby open the circuit of the motor M' which causes the latter to slow down slightly. This slowing down of the motor M' causes slowing down of the rotation of the ratchet wheel 18 and the ratchet wheel 17 will then drive the shaft 19 until the contacts 24, 25 are again closed. This operation will continue and thus keep the motor M' practically in synchronism with the motor M.

While I have shown and described my invention in detail, I do not wish to be limited to the form disclosed as it is clear that changes may be made therein without departing from the spirit of the invention.

Having thus described the invention, what is claimed and desired to be secured by Letters Patent is:

1. In a synchronizing apparatus, the combination of two machines, a rotatable, axially movable shaft having a straight groove parallel to its axis and also a helical groove, means actuated by one of said machines and coöperating with said straight groove for turing the shaft, means driven by the other machine and coöperating with the helical groove to control axial movement of the shaft, and means controlled by axial movement of the shaft for controlling the driving of the second machine.

2. The combination with two independent electric machines, of means for synchronizing said machines comprising a rotatable, axially movable, shaft, means responsive to the speed of one of said machines for rotating said shaft, means responsive to the speed of the other said machine for effecting axial movement of said shaft while it is rotating, and means controlled by the axial position of the shaft for controlling the energy supplied to said second machine.

3. The combination with two independent electric machines, of means for keeping one of said machines in synchronism with the other comprising a rotatable, axially movable, shaft, electromagnetic means for rotating said shaft, means for operating said electromagnetic means in response to the speed of one of said machines, electromagnetic means operating in response to the speed of the other of said machines for controlling axial movement of the shaft, and means controlled by the axial position of the shaft for controlling the energy supplied to said second machine.

4. In a synchronizing apparatus, the combination of a plurality of machines, a rotatable, axially movable, shaft, means actuated by one of the machines for intermittently turning said shaft, means actuated by another machine controlling axial movement of the shaft while it is being turned, said controlling means including an intermittently rotatable element, and means controlling the supply of power to one of said machines adapted to be operated by axial movement of the shaft.

5. The combination with two independent machines, of means for keeping one of said machines in synchronism with the other comprising a rotatable, axially movable, shaft, a ratchet and pawl mechanism operated by one of the machines for intermittently turning the shaft, means including a ratchet and pawl mechanism operated by the second machine for controlling axial movement of the shaft while it is being turned, and means for supplying power to the said second machine controlled by the axial movement of the shaft.

6. The combination of two electrically operated machines, a rotatable, axially movable, shaft having a straight groove parallel to its axis and a helical groove, a rotatable sleeve having an arm engaging the straight groove of said shaft, a ratchet wheel carried by said sleeve, a pawl, electromagnetic means controlled by one of the machines for operating the pawl to turn said ratchet wheel, sleeve and shaft intermittently, a second rotatable sleeve having an arm engaging the helical groove in the shaft, a ratchet wheel mounted on said second sleeve, a pawl coöperating with the last said ratchet wheel, electromagnetic means controlled by the other machine for operating the last said pawl to turn the associated ratchet wheel and control axial movement of the shaft while it is being rotated, and an electric switch controlling the second said machine and adapted to be actuated by axial movement of the shaft.

In testimony whereof I affix my signature.

LADISLAV O. KOZAR.